(12) United States Patent
Triglavcanin

(10) Patent No.: US 9,375,660 B2
(45) Date of Patent: Jun. 28, 2016

(54) METHOD AND DEVICE FOR SHEAR-THINNING OF SOLIDS CONTAINING MATERIAL

(75) Inventor: Richard Triglavcanin, Dalkeith (AU)

(73) Assignee: Outotec Oyj, Espoo (FI)

( * ) Notice: Subject to any disclaimer, the term of this patent is extended or adjusted under 35 U.S.C. 154(b) by 1812 days.

(21) Appl. No.: 12/298,268

(22) PCT Filed: Apr. 27, 2007

(86) PCT No.: PCT/FI2007/000111
§ 371 (c)(1),
(2), (4) Date: Oct. 23, 2008

(87) PCT Pub. No.: WO2007/125157
PCT Pub. Date: Nov. 8, 2007

(65) Prior Publication Data
US 2009/0200244 A1 Aug. 13, 2009

(30) Foreign Application Priority Data

Apr. 28, 2006 (FI) ........................................ 20060406

(51) Int. Cl.
*B01D 21/24* (2006.01)
*C22B 3/02* (2006.01)
*C22B 3/22* (2006.01)

(52) U.S. Cl.
CPC . *B01D 21/24* (2013.01); *C22B 3/02* (2013.01); *C22B 3/22* (2013.01); *Y02P 10/234* (2015.11)

(58) Field of Classification Search
USPC ........................................................ 210/173
See application file for complete search history.

(56) References Cited

U.S. PATENT DOCUMENTS

| | | | | |
|---|---|---|---|---|
| 1,617,739 A * | 2/1927 | Averill | ........................... | 516/139 |
| 4,127,332 A * | 11/1978 | Thiruvengadam et al. | ... | 366/131 |
| 4,440,225 A * | 4/1984 | Holzwarth | ..................... | 166/246 |
| 5,240,599 A * | 8/1993 | Kew et al. | ...................... | 210/173 |
| 7,179,374 B2 * | 2/2007 | Niitti | .............................. | 210/173 |
| 7,611,633 B2 * | 11/2009 | Gramme et al. | ............... | 210/708 |
| 7,842,184 B2 * | 11/2010 | Hassan et al. | .................. | 210/600 |
| 2005/0150822 A1 | 7/2005 | Niitti | | |

FOREIGN PATENT DOCUMENTS

| | | |
|---|---|---|
| WO | WO 97/27923 | 8/1997 |
| WO | WO 00/54870 | 9/2000 |

* cited by examiner

*Primary Examiner* — Krishnan S Menon
(74) *Attorney, Agent, or Firm* — Chernoff, Vilhauer, McClung & Stenzel, LLP

(57) ABSTRACT

This invention relates to a method and device to be used in connection with thickening and clarifying apparatuses for shear-thinning of solids containing material such as slurry. According to the invention the flow area of the shear-thinned material (11) is restricted by arranging a restriction element (12) in the conduit (4,15) for discharging back the shear-thinned material (11).

6 Claims, 2 Drawing Sheets

METHOD AND DEVICE FOR SHEAR-THINNING OF SOLIDS CONTAINING MATERIAL

Figure 1:
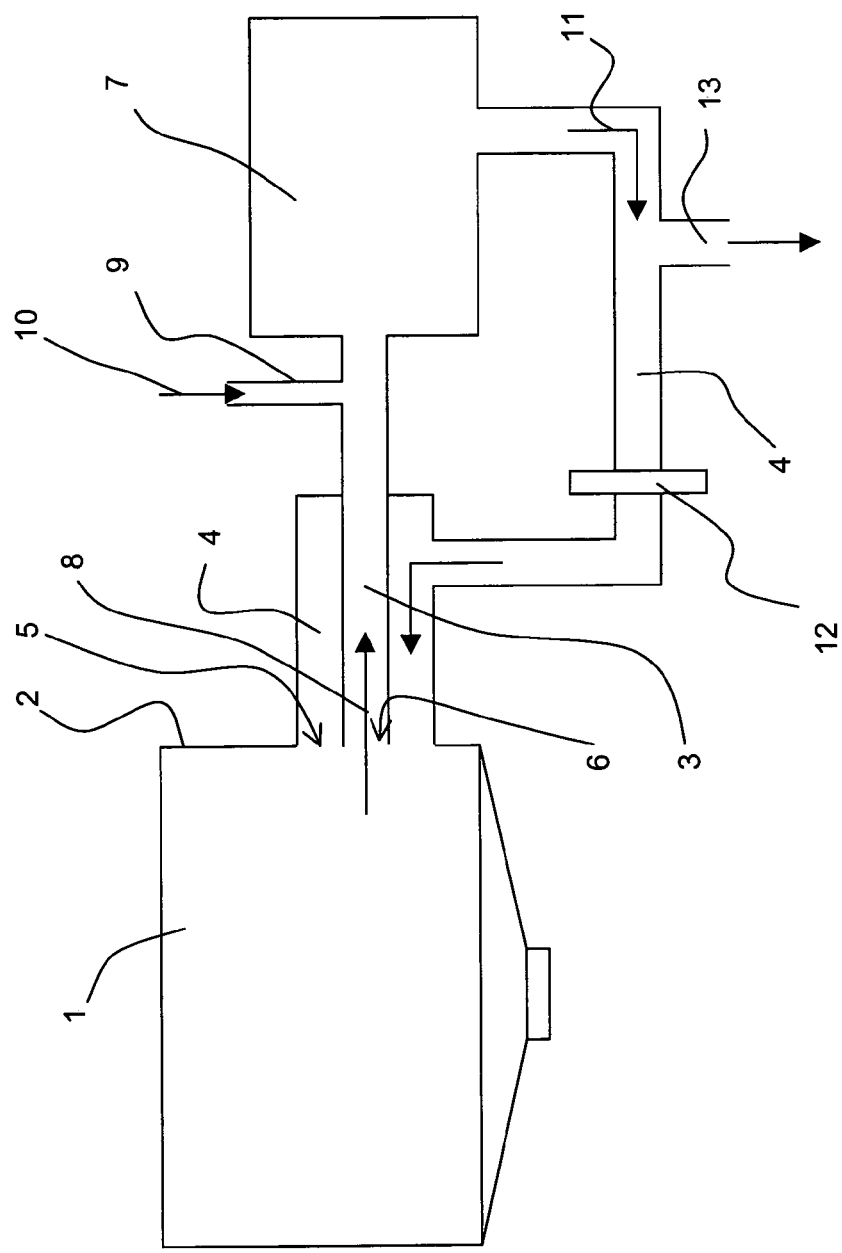

This application is a national phase entry under 35 U.S.C. §371 of International Application No. PCT/FI2007/000111, filed Apr. 27, 2007, hereby incorporated by reference, which itself claims priority to Finnish Patent Application No. 20060406, filed Apr. 28, 2006, hereby incorporated by reference.

This invention relates to a method and device to be used in connection with thickening and clarifying apparatuses for shear-thinning of solids containing material such as slurry having high-viscosity and yield stress.

The aim of thickening is to remove as much water as possible from material containing solids, e.g. mineral slurry. The most effective thickeners can achieve so high pulp densities that the viscosity (consistency, yield stress) of the material becomes too high for effective discharging of the said underflow product. A phenomenon called shear-thinning can be used to reduce the viscosity of the material and hence enable effective discharge of the said product.

The patent application US 20050150822 A1 discloses a device to be used in connection with thickening and clarifying apparatuses for shear-thinning of solids containing material such as slurry having high-viscosity. The apparatus for shear-thinning of slurry to be used in thickening and clarifying apparatuses is connected to a thickener by two conduits so that the openings of the conduits are installed in the wall of the thickener. The openings for the conduits are preferably positioned to each other essentially concentrically within the same surface when relating to the movement of slurry in those openings.

The object of the present invention is to achieve an improved method and device to be used in connection with thickening and clarifying apparatuses for shear-thinning of material containing solids such as slurry particularly in the solutions used in thickening and clarifying apparatuses. The essential features of the present invention are enlisted in the appended claims.

In accordance with the invention, the apparatus for shear-thinning of slurry to be used in thickening and clarifying apparatuses is connected to a thickener by two conduits so that the openings of the conduits are installed in the wall of the thickener. The openings for the conduits are preferably positioned to each other essentially concentrically within the same surface when relating to the movement of slurry in those openings. The openings for the conduits are of a different size so that one of the openings is situated inside the other opening. One of the openings is for feeding thickened material, such as slurry from the thickener to be shear-thinned and one of the openings is for discharging the shear-thinned material back into the thickener. According to this invention the flow area of the shear-thinned material is restricted by arranging a restriction element in the conduit for discharging back the shear-thinned material. This advantageously increases the shearing effect because restricting discharge flow exerts back pressure on the shear-thinning apparatus. By doing so the shear-thinning apparatus must do more work. More work is done on the slurry and hence increases the shearing effect on the slurry. The restriction element is a controllable valve, a manual valve or an orifice plate or any same kind of mechanism, which reduces the flow area for the shear-thinned material. There is a pressure drop across the restriction element, increased velocity, flow disturbance, increased mixing, or any other same kind of effect, which puts work or energy into the flowing shear-thinned material and further shears the slurry material and improves the shear-thinning. According to one embodiment of the invention the flow area of the shear-thinned material is restricted by arranging the restriction element in the end of the conduit connecting the shear-thinning apparatus. According to one embodiment of the invention the flow area of the shear-thinned material is restricted by arranging the restriction element in a part of the conduit that is not concentric.

The flow area of the shear-thinned material is restricted by arranging a restriction element either in the conduit having a larger external dimension or a smaller dimension in the end of connected to the thickening apparatus. When the surrounding conduit is used as a discharge conduit of the shear-thinning pump then the discharged and shear-thinned slurry is effectively mixed with slurry ingoing for the shear-thinning. This arrangement using the smaller conduit for discharging the shear-thinned material into the thickener is beneficial for such cases where the thickener discharge takes place from the bottom cone of the thickener. Using essentially concentric feeding and discharge openings for the slurry material the discharged and shear-thinned slurry material from the device for shear-thinning mixes with the thick slurry close to the feeding opening of the suction and thus improves the feed flow of the thick slurry into the shear thinning apparatus.

In the conduit between the shear-thinning apparatus and the restriction element there is arranged a discharge line for discharging at least part of the shear-thinned material. A part of the shear-thinned material is before returning into the thickener apparatus, channeled into a separate discharge conduit in order to be removed for further processing. The amount of material discharged via the discharge line is controlled by the restriction element and the shear-thinning apparatus. According to the invention the same shear-thinning apparatus can be used for both the thinning and for the thickener discharge tasks. A control system for the revolution of the pump and the valve operation is necessary to balance the amount of the thinning flow and the discharge flow. Typically a centrifugal pump is used for shear-thinning. In some solutions a cyclic movement is beneficial for the thinning of the slurry. Then a stroke diaphragm pump can be used instead of a centrifugal pump.

According to one embodiment of the invention the flow area of the shear-thinned material is restricted by arranging the restriction element at least partly in a part of the conduit that is concentric. The flow of the shear-thinned material after restriction element in the conduit can enter the wall of the thickening apparatus in any suitable direction for the process conditions, such as essentially perpendicular, tangentially, upwardly or downwardly depending on the design of the device.

Figure 2:
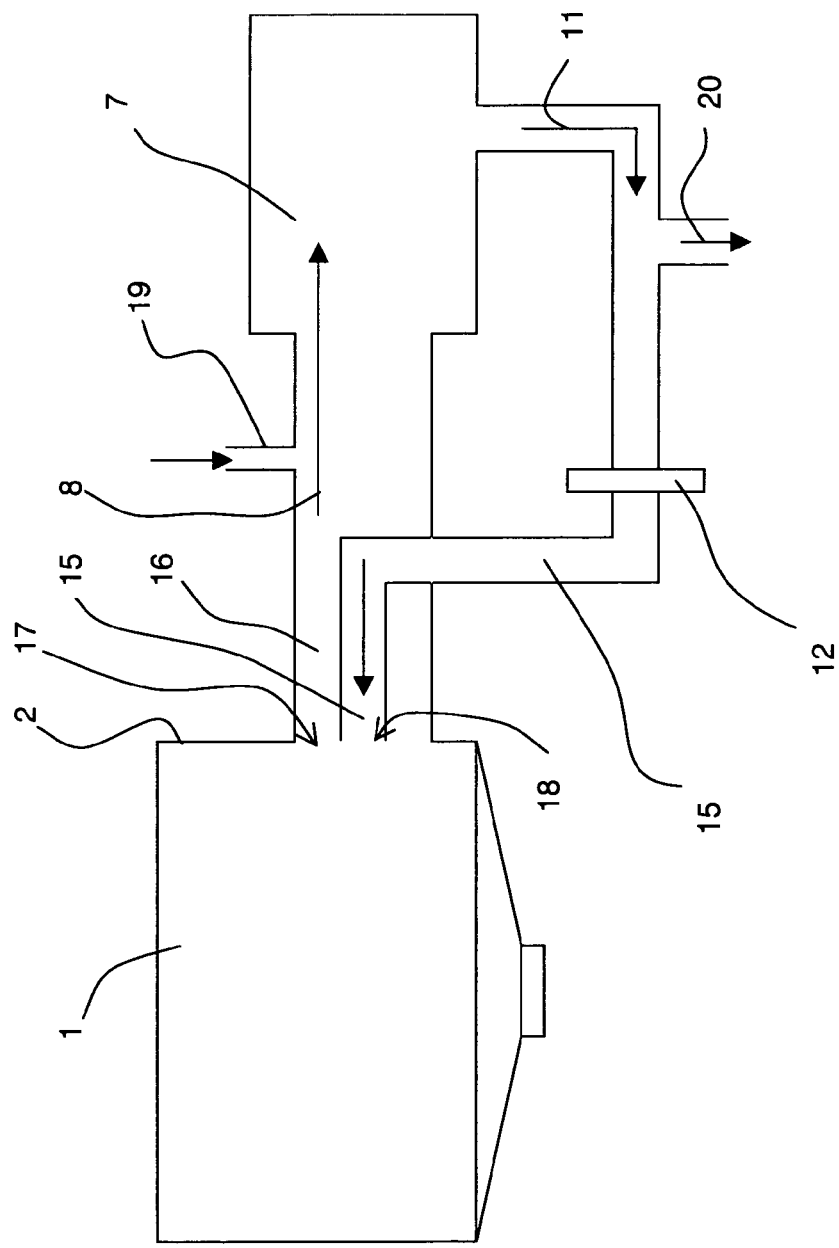

The invention is described in the following in more details referring to the appended drawings, in which FIG. 1 shows a preferred embodiment of the invention in a partly cut side view in schematic manner, FIG. 2 shows another preferred embodiment of the invention in a partly cut side view in schematic manner.

In accordance with FIG. 1 in a wall 2 of a thickener 1 two conduits 3 and 4 are installed so that the conduit 3 is concentrically positioned inside the conduit 4. Thus the conduit 3 has a smaller external dimension than the conduit 4. The end of the conduit 4 having a larger external dimension which end is attached to the wall 2 of the thickener 1 forms an opening 5 for the conduit 4. The conduit 3 having a smaller external dimension is installed inside the conduit 4 so that the end of the conduit 3 forms an opening 6, which is situated in the same surface with the opening 5 of the conduit 4.

The conduit 3 inside the conduit 4 is connected to a shear-thinning apparatus 7, typically such as a centrifugal pump or a stroke diaphragm pump. Thus the conduit 3 operates as a feeding conduit for slurry 8 to be shear-thinned by means of the apparatus 7. The conduit 3 is also provided with a connection 9 for dilution water 10 to be fed into the slurry 8 to be shear-thinned. The shear-thinning apparatus 7 is further connected to the conduit 4 through which the shear-thinned material 11 is discharged back into the thickener 1 via the conduit 4. According to the invention in the conduit 4, which is discharging the shear-thinned material 11 back to the thickener 1 there is arranged a restriction element 12, such as a valve which is controlled in order to improve the shear-thinning effect. The restriction element 12 is arranged at the end of the conduit connecting the shear-thinning apparatus 7 and preferably in the part of the conduit, which is not concentric. Between the shear-thinning apparatus 7 and the restriction element 12 there is arranged a discharge line 13 for discharging a part of the shear-thinned material 11 without any passage into the thickener 1 for further processing. The amount of discharged material via the discharge line 13, 20 is controlled by the restriction element 12 and the shear-thinning apparatus 7. The discharge line 13 could be provided with a pump in order to intensify the discharge for further processing. According to FIG. 1 the flow area of the shear-thinned material 11 is restricted by arranging a restriction element 12 in the conduit 4 having a larger external dimension in the end connected to the thickening apparatus 1.

In accordance with FIG. 2 in a wall 2 of a thickener 1 two conduits 15 and 16 are installed so that the conduit 15 is concentrically positioned inside the conduit 16. Thus the conduit 15 has a smaller external dimension than the conduit 16. The end of the conduit 16 having a larger external dimension which end is attached to the wall 2 of the thickener 1 forms an opening 17 for the conduit 16. The conduit 15 having a smaller external dimension is installed inside the conduit 16 so that the end of the conduit 15 forms an opening 18, which is situated in the same surface with the opening 17 of the conduit 16.

The conduit 16 having the larger dimension is connected to a shear-thinning apparatus 7, typically a pump and thus the slurry 8 to be shear-thinned is fed through the larger conduit 16 into the apparatus 7 by means of which the shear-thinning for the slurry is carried out. The conduit 16 is provided with a connection 19 in order to feed dilution water to slurry 8 to be shear-thinned. On the other side, the apparatus 7 is connected to the smaller conduit 15, which thus operates as a discharging conduit for the shear-thinned material 11 back into the thickener 1. In the conduit 15 there is arranged a restriction valve 12 for restricting the flow area of the shear-thinned material 11 in order to increase the back pressure of the shear-thinning apparatus and further improve the shear-thinning of the material 11. The smaller conduit 15 is further provided with a connection 20 through which a part of the shear-thinned slurry by-passes thickener 1 for further processing. According to FIG. 2 the flow area of the shear-thinned material 11 is restricted by arranging a restriction element 12 in the conduit 15 having a smaller external dimension in the end connected to the thickening apparatus 1.

According to the examples the flow of the shear-thinned material after restriction element 12 in the conduits 4, 15 enters essentially perpendicular the wall 2 of the thickening apparatus 1. The openings 3, 4, 15, 16 for the concentric conduits can also be positioned so that the conduits are positioned essentially tangentially to the wall of the thickener. When installing the conduits essentially tangentially into the wall of the thickener then the slurry discharged from the shear-thinning will be set into a rotating movement in the discharge boot. The conduits can also be directed downwards or upwards in relation to the wall of the thickener if more effective shear-thinning is needed close to the bottom of the thickener boot for example for more effective discharge.

While the invention has been described with reference to its preferred embodiments, it is to be understood that modifications and variations will occur to those skilled in the art. Such modifications and variations are intended to fall within the scope of the appended claims.

The invention claimed is:

1. Apparatus for producing shear-thinned slurry, comprising:
    a thickening apparatus having a wall,
    a shear-thinning apparatus,
    at least one first conduit for feeding slurry to be shear-thinned from the thickening apparatus to the shear-thinning apparatus, said first conduit having an end connected to the wall of the thickening apparatus,
    at least one second conduit for returning the shear-thinned slurry from the shear-thinning apparatus to the thickening apparatus, said second conduit having an end connected to the wall of the thickening apparatus, and
    at least one discharge line connected to the second conduit;
    wherein the first conduit and the second conduit are positioned essentially concentrically to each other at least in the ends connected to the thickening apparatus, said conduits forming openings in the wall of the thickening apparatus,
    and wherein the apparatus further comprises a controllable restriction element arranged in the second conduit and located downstream of the discharge line, wherein said restriction element restricts the flow area of the shear-thinned slurry and increases shear-thinning of the slurry.

2. Apparatus according to claim 1, wherein the second conduit has an end portion of a larger external dimension than the first conduit and concentrically surrounds an end portion of the first conduit and the restriction element is arranged in the second conduit upstream of said end portion thereof.

3. Apparatus according to claim 1, wherein the second conduit has an end portion of a smaller external dimension than the first conduit and concentrically surrounded by an end portion of the first conduit and the restriction element is arranged in the second conduit upstream of said end portion thereof.

4. Apparatus according to claim 1, wherein the restriction element is a controllable valve.

5. Apparatus for producing shear-thinned slurry, comprising:
    a thickening apparatus having a wall,
    a shear-thinning apparatus,
    at least one first conduit for feeding slurry to be shear-thinned from the thickening apparatus to the shear-thinning apparatus, said first conduit having an end connected to the wall of the thickening apparatus, and
    at least one second conduit for discharging back the shear-thinned slurry from the shear-thinning apparatus to the thickening apparatus, said second conduit having an end connected to the wall of the thickening apparatus,
    wherein the first conduit and the second conduit are positioned essentially concentrically to each other at least in the ends connected to the thickening apparatus, said conduits forming openings in the wall of the thickening apparatus,
    and wherein the apparatus further comprises a restriction element arranged in the second conduit, wherein said restriction element restricts the flow area of the shear-thinned slurry and increases shear-thinning of the slurry, and wherein the restriction element is an orifice plate.

6. Apparatus according to claim 1, further comprising a discharge line arranged between the shear-thinning apparatus and the restriction element for discharging a part of the shear-thinned slurry.

\* \* \* \* \*